UNITED STATES PATENT OFFICE.

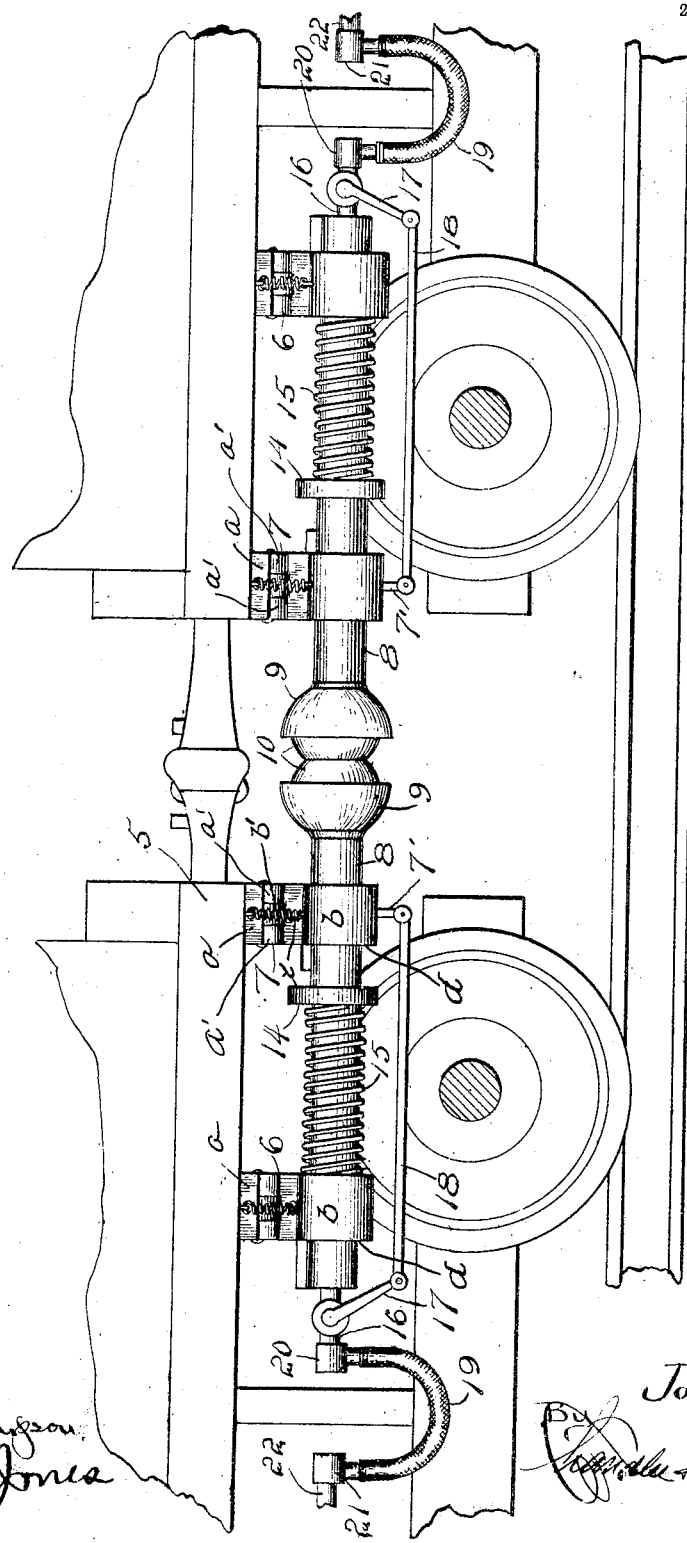

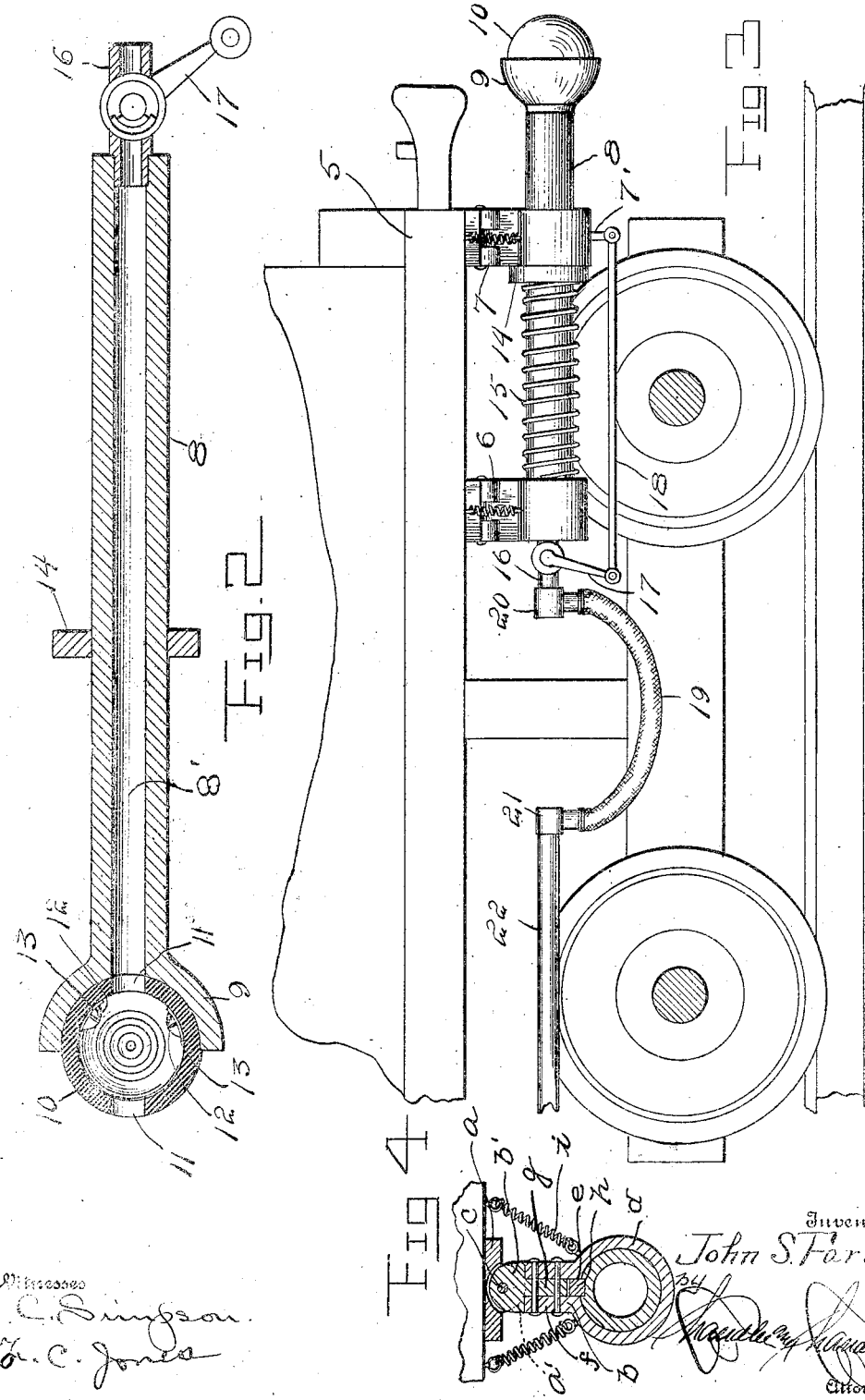

JOHN S. FARLOW, OF SALISBURY, MARYLAND.

AIR-BRAKE COUPLING.

No. 818,155.               Specification of Letters Patent.            Patented April 17, 1906.

Application filed October 27, 1905. Serial No. 284,728.

*To all whom it may concern:*

Be it known that I, JOHN S. FARLOW, a citizen of the United States, residing at Salisbury, in the county of Wicomico, State of Maryland, have invented certain new and useful Improvements in Air-Brake Couplings; and I do hereby declare the following to be a full, clear, and exact description of the invention, such as will enable others skilled in the art to which it appertains to make and use the same.

This invention relates to air-brakes, and more particularly to the couplings of the pipe-lines thereof, the invention embodying a coupling especially adapted for use in fluid pipe-lines on railroad-cars.

One object of the invention is to provide a coupling which while being extremely simple in arrangement and construction will be efficient and will not be likely to become broken or deranged.

Another object is to provide a coupling including valves and means for turning off the latter when the coupling is broken.

Other objects and advantages will be apparent from the following specification.

In the drawings forming a portion of this specification, and in which like numerals of reference indicate similar parts in the several views, Figure 1 is a side elevation, showing the present coupler in use connecting the pipes of two cars. Fig. 2 is a central longitudinal section of one of the members taken vertically. Fig. 3 is a side elevation of one of the cars, showing the valve in closed position. Fig. 4 is a detail sectional view of the sleeve and one of the brackets taken transversely.

Referring now to the drawings, the present coupler of course includes two members, one carried by each car. These members are identical, however, so a description of one will suffice.

There is shown a car 5, having secured thereto depending brackets 6 and 7, respectively, which are spaced from each other longitudinally of the car, the brackets 7 being located adjacent to the ends thereof. A sleeve 8 is slidably disposed in the brackets and occupies a horizontal position, and this sleeve carries at its outer end a funnel 9, formed integral with the sleeve and having its major end directed outwardly. Secured within this funnel there is a hollow resilient sphere 10, formed, preferably, of rubber and having alining openings 11 and 11' therein, the former being formed in the outer portion of the sphere, while the latter is formed in the inner portion thereof and communicates with the passage 8' of the sleeve. This sphere is secured in position by screws 12, engaged in the sphere and in the funnel 9, these screws having washers 13, which are pressed into the material of the sphere to prevent the passage of air, dust, or other fluid from the sphere around the screws.

A collar 14 is carried by the sleeve 8 between the brackets 6 and 7, and a helical spring 15 is engaged with the sleeve between this collar and the bracket 6, this spring holding the sleeve against inward movement, while the collar is arranged for engagement of the bracket 7 to limit the outward movement of the sleeve.

A turning-plug 16 is engaged in the rearward end of the sleeve, and its movable member carries a laterally-extending arm 17, to which is pivoted one end of a link 18, the other end of the link being pivotally connected with the bracket 7, and the arrangement is such that when the sleeve is moved rearwardly the turn-plug is opened, while forward movement of the sleeve under the action of the spring 15 closes the plug. A flexible hose 19 is carried by a cap 20, engaged with the rearward end of the plug 16, and carries a cap 21, which is engaged with the fluid-supply pipe 22.

In use when two cars are coupled the spheres 10 thereof have their outer portions brought together to register their openings 11, and the sleeves 8 are of such length that they are moved against the action of their springs 15 to open the valves 16, when the pressure of the fluid within the sphere 10 will prevent the collapse thereof.

Each of the brackets 6 and 7 includes a stationary attaching-plate *a*, having depending ears *a'*, which are spaced from each other longitudinally of the car. A movable member *b* has an upwardly-extending wing *b'*, which is engaged between the ears *a'* and receives therewith a pivot-pin *c*. The movable member *b* of each bracket consists of a collar *d*, having a longitudinal slot *e* therein at its top and opening through its ends. Vertical flanges *f* extend upwardly from the sleeve at opposite sides of its slot, and secured between these flanges there is a plate *g*, which carries the ear *b'*. This plate *g* terminates short of the bottom of the slot *e*, and the sleeve 8 is longitudinally slotted to receive a key *h*, which is engaged in the slot e, the sleeve being thus prevented from rotation in the bracket. It will be understood that all of the brackets have the same structure. Springs i are secured at their lower ends to the collar d and at their upper ends to the car to hold the member b yieldably against movement with respect to the member a.

What is claimed is—

1. The combination with a car, of brackets secured thereto in spaced relation longitudinally of the car, a sleeve slidably engaged in the brackets and extending beyond the end of the car, a hollow resilient body carried by the outer end of the sleeve, said body having an opening in its outer portion and having another opening communicating with the passage of the sleeve, a collar carried by the sleeve between the brackets and arranged for engagement of the outer bracket to limit the outward movement of the sleeve, a spring disposed between the collar and the inner bracket to held the sleeve yieldably against inward movement, a turn-plug carried by the rearward end of the sleeve, means for automatically operating the turn-plug when the sleeve is moved, a fluid-supply pipe, and flexible connections between the turn-plug and said supply-pipe.

2. The combination with a car, of brackets secured thereto in spaced relation longitudinally of the car, a sleeve slidably engaged in the brackets and extending beyond the end of the car, a funnel carried by the outer end of the sleeve, a hollow resilient body secured in the funnel, said body having registering openings therein alining with the passage of the sleeve, a collar carried by the sleeve between the brackets and adapted for engagement of the outer bracket to limit the outward movement of the sleeve, a helical spring engaged with the sleeve between the collar and the inner bracket to hold the sleeve yieldably against inward movement, a turn-plug engaged in the inner end of the sleeve, a cap engaged with the inner end of the turn-plug, a fluid-supply pipe, a cap engaged with the fluid-supply pipe, flexible connections between the caps for the passage of fluid from one cap to the other, and means for automatically operating the valve when the sleeve is moved in the brackets, said means being arranged to close the valve when the sleeve is moved outwardly and to open the valve when the sleeve is moved inwardly.

3. In an air-brake coupling, the combination with a sleeve having an exterior longitudinal slot therein, of a collar slidably engaged with the sleeve, said collar having a slot registering with that of the groove, flanges carried by the collar at opposite sides of its slot and extending outwardly therefrom, a plate secured between the flanges, a wing carried by the plate, an attaching-plate, spaced wings carried by the attaching-plate and lying at opposite sides of the first-named wing, a pivot-pin engaged in the wings, a key removably engaged in the registering slots, and means for holding the first-named wing yieldably against pivotal movement with respect to the second-named wings.

In testimony whereof I affix my signature in presence of two witnesses.

JOHN S. FARLOW.

Witnesses:
GEORGE W. BELL,
GEO. W. COLLINS.